(12) United States Patent
Schmiz et al.

(10) Patent No.: US 7,607,509 B2
(45) Date of Patent: Oct. 27, 2009

(54) SAFETY DEVICE FOR A VEHICLE

(75) Inventors: Marc Schmiz, Tubis (LU); Guido Becker, Losheim am See (DE); Thierry Mousel, Mondorf-les-Bains (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 592 days.

(21) Appl. No.: 10/510,184

(22) PCT Filed: Jan. 13, 2003

(86) PCT No.: PCT/EP03/00238

§ 371 (c)(1),
(2), (4) Date: May 16, 2005

(87) PCT Pub. No.: WO03/089277

PCT Pub. Date: Oct. 30, 2003

(65) Prior Publication Data

US 2005/0232460 A1    Oct. 20, 2005

(30) Foreign Application Priority Data

Apr. 19, 2002    (LU) .................................... 90912
Apr. 26, 2002    (LU) .................................... 90914

(51) Int. Cl.
    *B60K 28/10* (2006.01)
(52) U.S. Cl. .................................................. 180/274
(58) Field of Classification Search ............. 180/271, 180/274; 382/103, 104
    See application file for complete search history.

(56) References Cited

U.S. PATENT DOCUMENTS

| | | | |
|---|---|---|---|
| 5,410,346 A | * | 4/1995 | Saneyoshi et al. ........... 348/116 |
| 5,535,314 A | * | 7/1996 | Alves et al. .................. 382/165 |
| 5,737,083 A | | 4/1998 | Owechko et al. |
| 5,892,855 A | * | 4/1999 | Kakinami et al. ........... 382/291 |
| 6,061,014 A | | 5/2000 | Rautanen et al. |
| 6,198,998 B1 | | 3/2001 | Farmer et al. |

(Continued)

FOREIGN PATENT DOCUMENTS

DE    197 52 145    5/1999

(Continued)

OTHER PUBLICATIONS

International Search Report; PCT/EP03/00238; Jun. 3, 2003.

(Continued)

*Primary Examiner*—Faye M. Fleming
(74) *Attorney, Agent, or Firm*—Cantor Colburn LLP (57) ABSTRACT

The invention relates to a device for detecting and localising objects. The inventive device comprises a 3D camera for recording three-dimensional situation images of an area to be monitored; first means for evaluating the three-dimensional situation images using suitable object detection methods for determining an object in the area to be monitored and the position of the object in said area; a 2D camera for recording two-dimensional situation images of the region in the area to be monitored in which the position of the object has been determined; and second means for evaluating the two-dimensional situation images using suitable object detection methods for redetermining the object in the area to be monitored.

37 Claims, 5 Drawing Sheets

U.S. PATENT DOCUMENTS

| | | | |
|---|---|---|---|
| 6,285,778 B1 * | 9/2001 | Nakajima et al. | 382/104 |
| 6,480,616 B1 | 11/2002 | Hata et al. | |
| 6,580,385 B1 * | 6/2003 | Winner et al. | 342/70 |
| 6,593,873 B2 * | 7/2003 | Samukawa et al. | 342/70 |
| 6,661,449 B1 * | 12/2003 | Sogawa | 348/113 |
| 7,049,945 B2 * | 5/2006 | Breed et al. | 340/435 |
| 7,079,668 B2 * | 7/2006 | Kogure et al. | 382/104 |
| 7,161,616 B1 * | 1/2007 | Okamoto et al. | 348/148 |
| 2002/0149184 A1 | 10/2002 | Ertl et al. | |
| 2003/0125855 A1 * | 7/2003 | Breed et al. | 701/36 |
| 2003/0210807 A1 * | 11/2003 | Sato et al. | 382/104 |
| 2004/0075544 A1 * | 4/2004 | Janssen | 340/435 |

FOREIGN PATENT DOCUMENTS

| | | |
|---|---|---|
| DE | 19956266 | 6/2001 |
| DE | 10035531 | 2/2002 |
| EP | 0 885 782 | 12/1998 |
| EP | 1 069 001 | 1/2001 |
| EP | 1103821 | 5/2001 |
| FR | 2 815 135 | 4/2002 |
| JP | 11160022 | 6/1996 |
| JP | 2000280858 | 10/2000 |
| WO | WO 96 15626 | 5/1996 |
| WO | WO 98 10255 | 3/1998 |
| WO | 01/19648 | 3/2001 |
| WO | WO 01/19648 | 3/2001 |
| WO | WO 02 08022 | 1/2002 |

OTHER PUBLICATIONS

Irani M. et al.; "A Unified Approach to Moving Object Detection in 2D and 3D Scenes"; IEEE Transactions on Pattern Analysis and Machine Intelligence, IEEE Inc. New York, US, vol. 20, No. 6, Jun. 1, 1998, pp. 577-589, XP000773365; ISSN: 0162-8828.

* cited by examiner

SAFETY DEVICE FOR A VEHICLE

TECHNICAL FIELD OF INVENTION

The present invention relates to a safety device for a vehicle, in particular a device for detecting and/or locating objects or persons in the vicinity of a vehicle. Such a device may be used, for example, in a passenger restraint system for controlling one or more airbags, in a comfort system (for automatically setting headrests and/or vehicle seats and/or rear view mirrors etc.) or in a system for avoiding accidents. The invention also relates to a method for detecting and/or locating objects and persons.

BRIEF DESCRIPTION OF THE RELATED ART

In order to reduce the risk of injury for the occupants of a vehicle in the event of an accident, modern vehicles are generally equipped with an active passenger restraint system. Such an active passenger restraint system comprises one or more airbags which are inflated instantaneously when the vehicle experiences an impact, and which absorb energy which is released by the passenger when the impact occurs, and if appropriate seatbelt tensioning devices or the like.

Since an airbag such as a front-mounted airbag emerges from the dashboard or the impact absorber of the steering wheel at very high speeds (200 to 300 km/h), the passenger can possibly suffer injury from the triggering airbag if his sitting position is unfavorable under the circumstances. In order to avoid this, microprocessor-controlled restraint systems with a plurality of operating modes have been developed which permit various triggering parameters of the restraint system to be adapted as a function, inter alia, of the position of the passenger on the vehicle seat or his stature, said parameters being, for example, the time at which inflation occurs, the inflating speed and/or the inflation volume of the airbag.

In order to enable such adaptation of the triggering parameters of the restraint system by means of the microprocessor, the latter must of course be supplied with various parameters relating to the sitting position or the stature of the respective passenger. Such a passenger restraint system must consequently be equipped with a device for determining these parameters.

Known devices for detecting the stature or the sitting position of a passenger are based, for example, on detecting the weight distribution of the passenger in the seat. Based on the determined weight distribution it is possible to draw conclusions about the parameters to be detected, using statistical correlation functions.

A completely different approach to detecting a seat occupation is adopted by systems which determine a presence and, if appropriate, a sitting position of a passenger by means of image-forming systems. In such systems, the passenger compartment of the vehicle is monitored by means of one or more cameras and the recorded video signal is evaluated by means of suitable image processing methods. By using modern CCD or CMOS cameras with high resolution it is possible to detect objects relatively accurately by means of such systems, i.e. it is possible to distinguish, with relative accuracy, whether the vehicle seat is unoccupied or whether it is occupied by a child's seat or by a passenger. Furthermore, by detecting the vertical position of the head of a passenger it is possible to determine the stature of the passenger.

In order to detect the sitting position of a passenger with accuracy, there is, in addition to the two-dimensional image information, also a need for depth information, i.e. information about the distance between the camera and the object of interest (for example the head of the passenger). For this purpose, for example stereoscopic methods are used which calculate depth information from two images which are taken in a laterally offset fashion. A device, which operates according to such a method, is known, for example, from EP-A-0 885 782.

As an alternative to these stereoscopic methods, methods are known which evaluate unsharpness of the recorded image with respect to a focal plane. The passenger compartment of the vehicle is recorded with a single camera with a rather low depth of focus. An object which is located in a plane which is different from the focal plane is blurred in the recorded image which. This lack of focus can be detected computationally by means of suitable image processing methods and the distance of the object from the focal plane can be determined therefrom. Such a method is described, for example, in U.S. Pat. No. 6,198,998.

The described methods and devices provide good results in object detection by virtue of the good resolution of modern CCD or CMOS cameras. However, the quantity of data which is to be processed in such systems is relatively large, in particular when stereoscopic methods are used. Since the position of a passenger has to be detected in real time, these systems make enormous requirements of the image-processing system.

In addition to these devices which are based on the evaluation of two-dimensional recorded images, systems are known which directly supply depth information for the image information by measuring the time of flight of modulated infrared light. Such 3-D cameras are known, for example, from the publications WO-A-96/15626 and WO-A-98/10255. In contrast to the 2-D cameras described above, 3-D cameras have a comparatively low resolution, as result of which the quantity of data which is to be processed is significantly reduced. Moreover, the depth information which is required to determine the position of the object of interest is directly available. However, the low resolution of a 3-D camera causes problems for the reliable detection of objects.

BRIEF SUMMARY OF THE INVENTION

The invention proposes an improved system for detecting and locating objects.

The invention provides a device for detecting and locating objects comprising a 3-D camera for recording three-dimensional situation images of a space which is to be monitored;

first means for evaluating the three-dimensional situation images by means of suitable object detection methods for determining an object which is present in the space which is to be monitored, and for determining the position of the object in the space;

a 2-D camera for recording two-dimensional situation images of that region of the space which is to be monitored, in which the position of the object has been determined; and second means for evaluating the two-dimensional situation images by means of suitable object detection methods for redetermining the object which is present in the space which is to be monitored.

In addition to the device, the invention also relates to a method for detecting and locating objects, comprising the steps of:

recording a first, three-dimensional situation image of a space which is to be monitored by means of a 3-D camera, evaluating the first, three-dimensional situation image by means of suitable object detection methods for determining an object which is present in the space which is to be monitored, and for determining the position of the object in the space;

recording a second, two-dimensional situation image of a specific region of the space which is to be monitored by means of a 2-D camera, the specific region corresponding to the region of the space in which the position of the object has been determined;

evaluating the second, two-dimensional situation image in order to redetermine the object which is present.

Alternatively, the invention provides a device for detecting and locating objects comprising a 3-D camera for recording three-dimensional situation images of a space which is to be monitored;

first means for evaluating the three-dimensional situation images by means of suitable object detection methods for determining an object which is present in the space which is to be monitored, and for determining the position of the object in the space;

a 2-D camera for recording two-dimensional situation images of the space which is to be monitored; and second means for evaluating a specific region of the two-dimensional situation images by means of suitable object detection methods for redeterming the object which is present in the space which is to be monitored, the specific region corresponding to the region of the space in which the position of the object has been determined.

In this case, the method for detecting and locating objects comprises method for detecting and locating objects the steps of:

recording a first, three-dimensional situation image of a space which is to be monitored by means of a 3-D camera, evaluating the first, three-dimensional situation image by means of suitable object detection methods for determining an object which is present in the space which is to be monitored, and for determining the position of the object in the space;

recording a second, two-dimensional situation image of the space which is to be monitored by means of a 2-D camera;

evaluating a specific region of the second, two-dimensional situation image is evaluated in order to determine once more the object which is present, the specific region corresponding to the region of the space in which the position of the object has been determined.

The device according to the invention and the method according to the invention advantageously combine the advantages in terms of high speed and the small quantity of data of a 3-D camera system with the high resolution and the resulting reliable detection of the object of 2-D camera systems. In fact, with the proposed device, the entire space which is to be monitored is firstly sensed using a 3-D camera and the image which is acquired in the process is evaluated in view of a first object detection. Since the resolution of a 3-D camera is relatively low, the quantities of data which have to be processed are correspondingly small. The depth information which is obtained at the same time can be used directly for determining positions.

Then, using the 2-D camera, only the region of the space to be monitored which is of interest, i.e. the region in which the position of the object has been determined, can be sensed once more using the 2-D camera. The high-resolution two-dimensional image, which is acquired in this context, is then processed for a new object detection. In the alternative described embodiment of the invention, a two-dimensional image of the entire region which is to be monitored is taken using the 2-D camera but only the region of the image which is of interest is evaluated.

The first object detection, which has been carried out on the basis of a three-dimensional image, can be verified by means of this new evaluation, as a result of which the disadvantage of the low resolution of the three-dimensional image can be compensated for. It is to be noted that the quantity of data which is to be processed when verifying the object detection is significantly reduced in comparison with a conventional object detecting process in the space since, during this verification process, either only the region of the space which is of interest is sensed and processed or only the region of the 2-D image which is of interest is evaluated. In comparison to the conventional object detection methods, both alternatives of the invention accordingly reduce (in different ways) the quantity of data which is to be processed for the 2-D object detection.

The method according to the invention is accordingly characterized by an extremely fast detection of the position of an object and a high degree of reliability of the object detection while at the same time the quantities of data to be processed are small.

It is to be noted that in the first embodiment of the invention the 2-D image region, which is recorded, can be restricted to the region of interest either by swiveling the 2-D camera or by means of a zoom function of the camera. In contrast to this, in the second embodiment, the 2-D camera does not need to be of movable or to be equipped with a zoom function. In fact, the region which the 2-D camera records can correspond to that of the 3-D camera since the reduction of the quantity of data to be processed can be carried out by software. Only that part of the recorded overall image which contains the object to be detected is processed.

Owing to the small quantities of data, the requirements for the processor power of the system are correspondingly low. This preferably permits the first means for evaluating the three-dimensional situation images and the second means for evaluating the two-dimensional situation images to be implemented in a common processor unit.

In one advantageous embodiment of the device, the 3-D camera and the 2-D camera are arranged directly adjacent to one another. The 3-D camera and the 2-D camera can be arranged, for example, in a common housing. By means of such an arrangement, parallax errors between the recorded two-dimensional and three-dimensional images can be effectively avoided. Furthermore, the assignment of the individual detection regions is made easier.

In one advantageous embodiment of the invention, the 3-D camera and the 2-D camera operate in the same spectral region. Both cameras thereby preferably operate with a common light source for illuminating the space which is to be monitored with light of a wavelength which is contained in the spectral region, for example an infrared region. As a result, errors resulting from different illumination of the object which is to be detected are effectively avoided. Furthermore, the influence of extraneous illumination can be significantly reduced so that simplified algorithms for image processing can be used.

The light source is advantageously arranged together with the 3-D camera and the 2-D camera in a common housing.

In one application of the method described above, the invention also relates to a method for controlling a restraint system in a vehicle, comprising the steps of:

determining an object and detecting the position of the object in the region of a vehicle seat, generating a control signal which is specific to the type and position of the object which has been determined and transmitting the control signal to a control unit of the restraint system;

selecting a suitable function mode of the restraint system on the basis of the control signal which has been transmitted.

The invention is used in this case to classify a seat occupation, the high detection reliability of the object which is to be detected, for example of a child's seat or of a head of a vehicle occupant, enabling a reliable classification of the seat occupation. A restraint system which operates according to this method can consequently be switched, with a particularly low error quotient, into a mode which is appropriate for the occupation situation which is detected at a given time.

It is to be noted that the determination of the position of the head of a vehicle occupant permits the sitting height of this occupant to be calculated. One advantageous embodiment of the method takes into account this height of the torso in the classification of the seat occupation. In this case, the generation of a control signal comprises the calculation of a height of a torso of the vehicle occupant on the basis of the position of the head.

The present invention can preferably also be used in a method for avoiding accidents. Such a method for avoiding accidents in a vehicle comprises, for example, the steps of: determining an object and detecting the position of the object in the region of an area surrounding the driver according to the method described above, and initiating suitable measures if the specific position of the object potentially counteracts safe driving of the vehicle.

This method can be used, for example, to detect a body posture of the driver which is atypical for driving the vehicle. Such an atypical body posture can result from acute illness, excessive fatigue or irresponsible behavior of the driver.

In one possible embodiment of the method, the object comprises a body part of the driver, the suitable measures being initiated if the position of the body part is determined in a region, which is associated with an inappropriate body posture for driving the vehicle. The body part can comprise, for example, the head of the driver. If the driver assumes a body posture with his torso inclined forward owing to illness or owing to excessive fatigue, the head is in a position, which is not suitable for safely driving the vehicle. When such an atypical head position is detected, suitable countermeasures can be initiated according to the present method.

A similar atypical head position can also arise due to irresponsible behavior of the driver if the driver is, for example, picking up an object from the floor of the vehicle or from a rear seat of the vehicle. Such a position of the head can also be detected with the present method and corresponding measures can be initiated. Alternatively to the head, other body parts of the driver can also be monitored for atypical or irresponsible behavior. Thus, for example, the detection of a foot in the region of the dashboard can be recognized as an extremely dangerous and highly irresponsible body posture. With the aforesaid method it is also possible to detect if the driver takes both hands off the steering wheel. In all these cases, suitable measures can be initiated such as, for example, the generation of a visual or audible warning signal and/or the triggering of an emergency brake system and/or the recording of the driver's behavior and/or the selection of a suitable function mode of the restraint system. It is to be noted here that in particular the recording of the driver's behavior can provide important information about the culpability of the driver if an accident should occur.

In another embodiment of the method the object comprises an item, one or more of the described measures being initiated if the position of the item is determined in a field of vision of the driver. With such a method it is possible, for example, to generate an audible warning tone if a highly irresponsible driver is studying a map while driving or reading a newspaper, for example in stop-go traffic.

It is to be noted that for the method described above the camera system is preferably arranged in a region directly in front of the driver of the vehicle.

The method according to the invention and the device according to the invention have a further advantageous application in the control of a precrash system, wherein suitable safety measures are initiated in accordance with the type of the object which is determined and its position in the area outside the vehicle. Such a system may, for example, trigger an emergency brake system when the vehicle approaches an obstacle in the front region (or in the rear region when reversing). In another variant, when a pedestrian is detected in the direct vicinity in front of the driving vehicle, an external airbag may be fired or the hood of the engine of the vehicle may be tipped into a slightly raised position in order to avoid, or at least reduce, injuries to the pedestrian.

In a further application, the invention can be used in the control of an anti-theft warning system in a vehicle. Use is also possible in a comfort-increasing system in which various comfort functions are set to the sitting height of the respective passenger.

It is to be noted that, when a plurality of applications are combined in the vehicle, a plurality of camera units can be connected to a common electronic evaluation system. For example, a first camera unit can monitor the passenger compartment of the vehicle in order to detect the seat occupation while a second camera unit monitors the outside area in front of the vehicle, and a third unit monitors the outside area behind the vehicle.

It is also to be noted that the existing camera system can also be used in other applications. For example, videophone transmission by means of the built-in camera is conceivable.

BRIEF DESCRIPTION OF THE DRAWINGS

In the following text an embodiment of the invention is described with reference to the appended figures, of which.

DETAILED DESCRIPTION OF THE INVENTION

Figure 1:
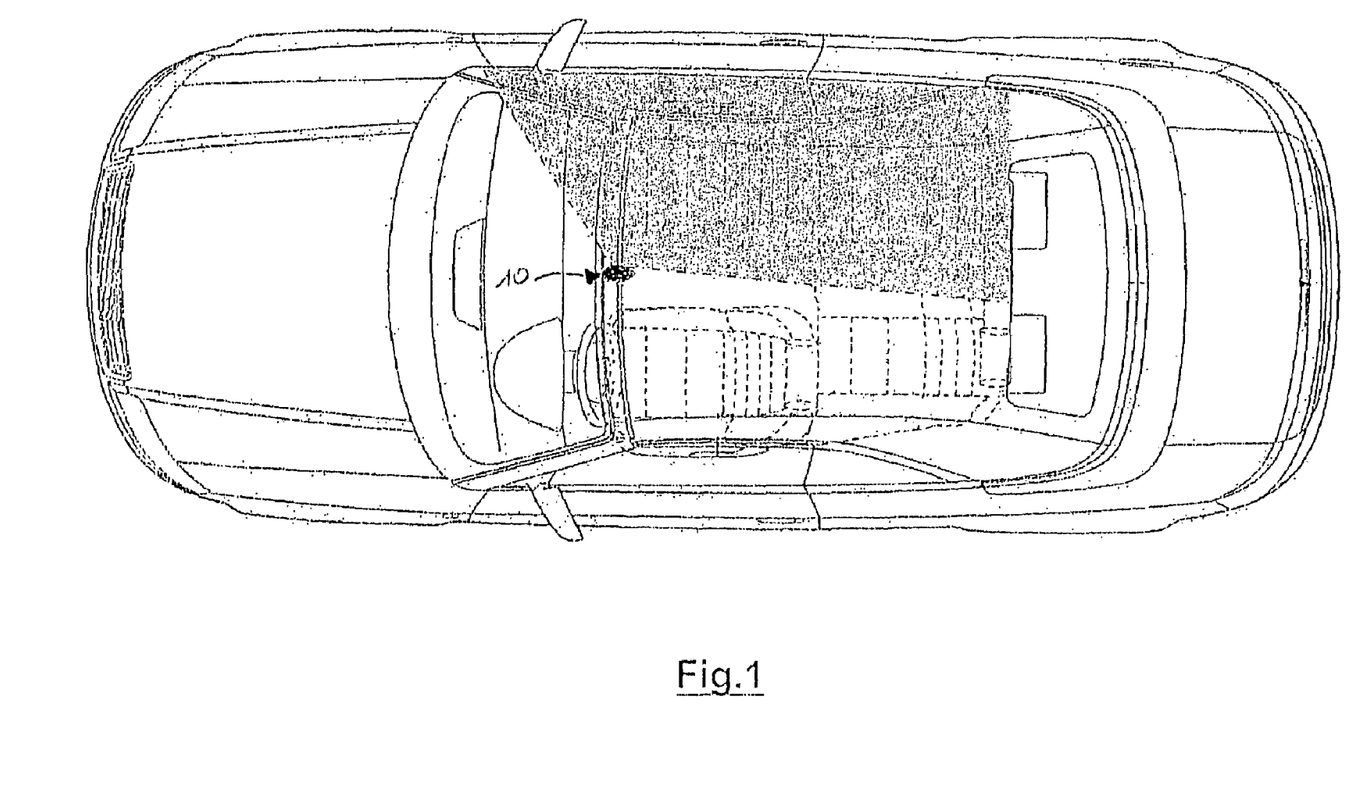
FIG. 1 shows a schematic view of an application of the method according to the invention for monitoring the passenger compartment in a vehicle.

In FIG. 1, the use of a device according to the invention for monitoring the passenger compartment of a vehicle is illustrated. In such a use, a device 10 for detecting and locating an object is arranged, for example, in the front region of the vehicle, directly underneath the roof of the vehicle. The illustrated embodiment is a camera module for monitoring the front seat passenger's side, i.e. the field of vision of the camera is directed toward the front seat passenger's side. Alternatively, the device can of course also be arranged in such a way that the field of vision of the camera module is directed toward the driver's side. Depending on the arrangement and configuration of the camera module, both sides of the vehicle and/or the rear seat region of the vehicle can also be monitored simultaneously.

Figure 2:
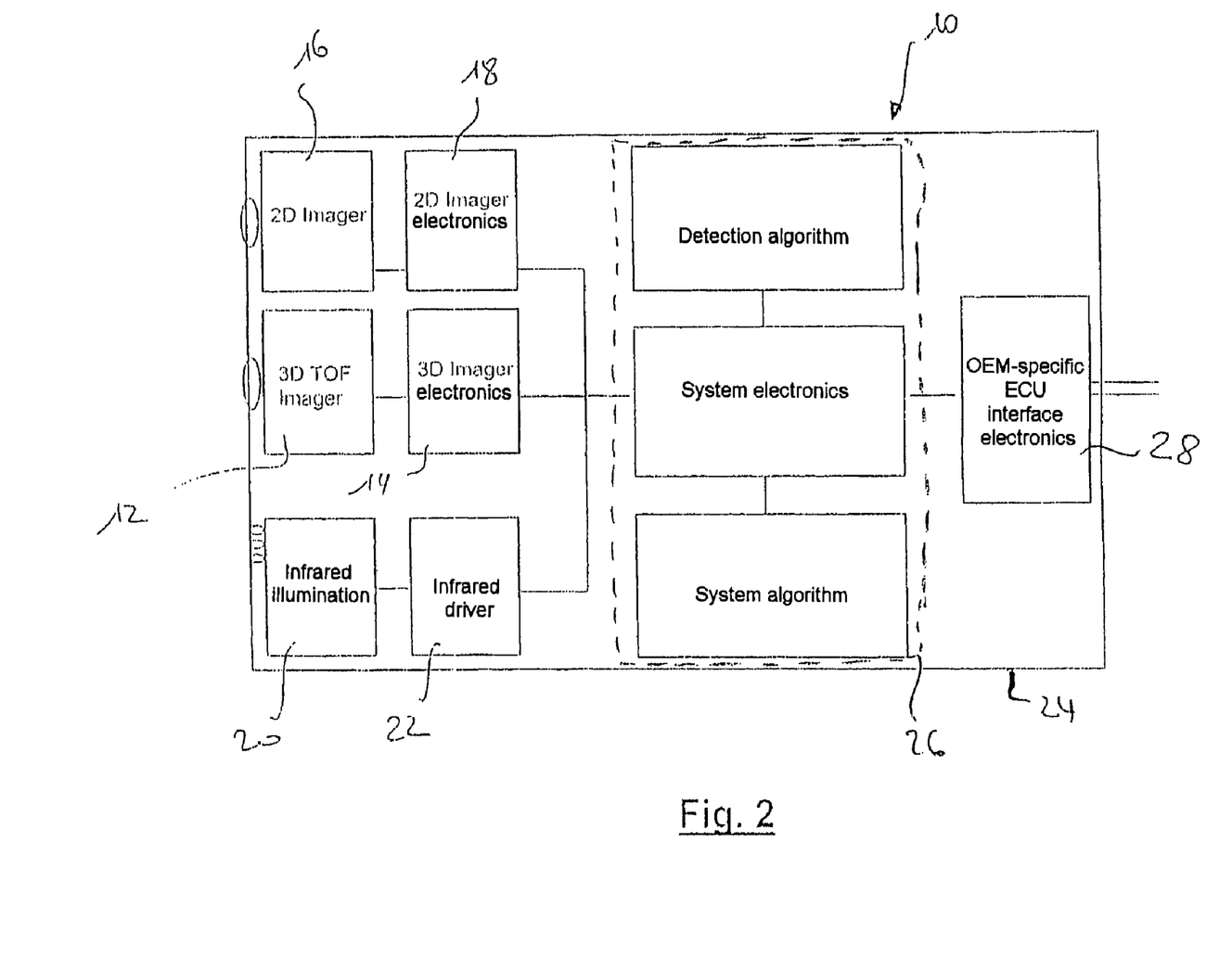
FIG. 2 shows a possible design of a embodiment of a device according to the invention.

A possible design of a camera module 10 is illustrated in FIG. 2. It comprises essentially a 3-D camera 12 with connected electronics 14, a 2-D camera 16 with connected electronics 18 and a suitable illumination source 20 with associated driver 22. The cameras are preferably arranged directly adjacently to one another so that parallax errors between the two-dimensional and the three-dimensional images are avoided. The 3-D camera, the 2-D camera 16 and the illumination source 20 are preferably arranged in a common housing 24 in which the processor unit 26 is also arranged. The module 10 may be manufactured as a prefabricated unit which is connected to the control electronics of a restraint system via a specific interface 28 when it is installed in the vehicle.

Figure 3:
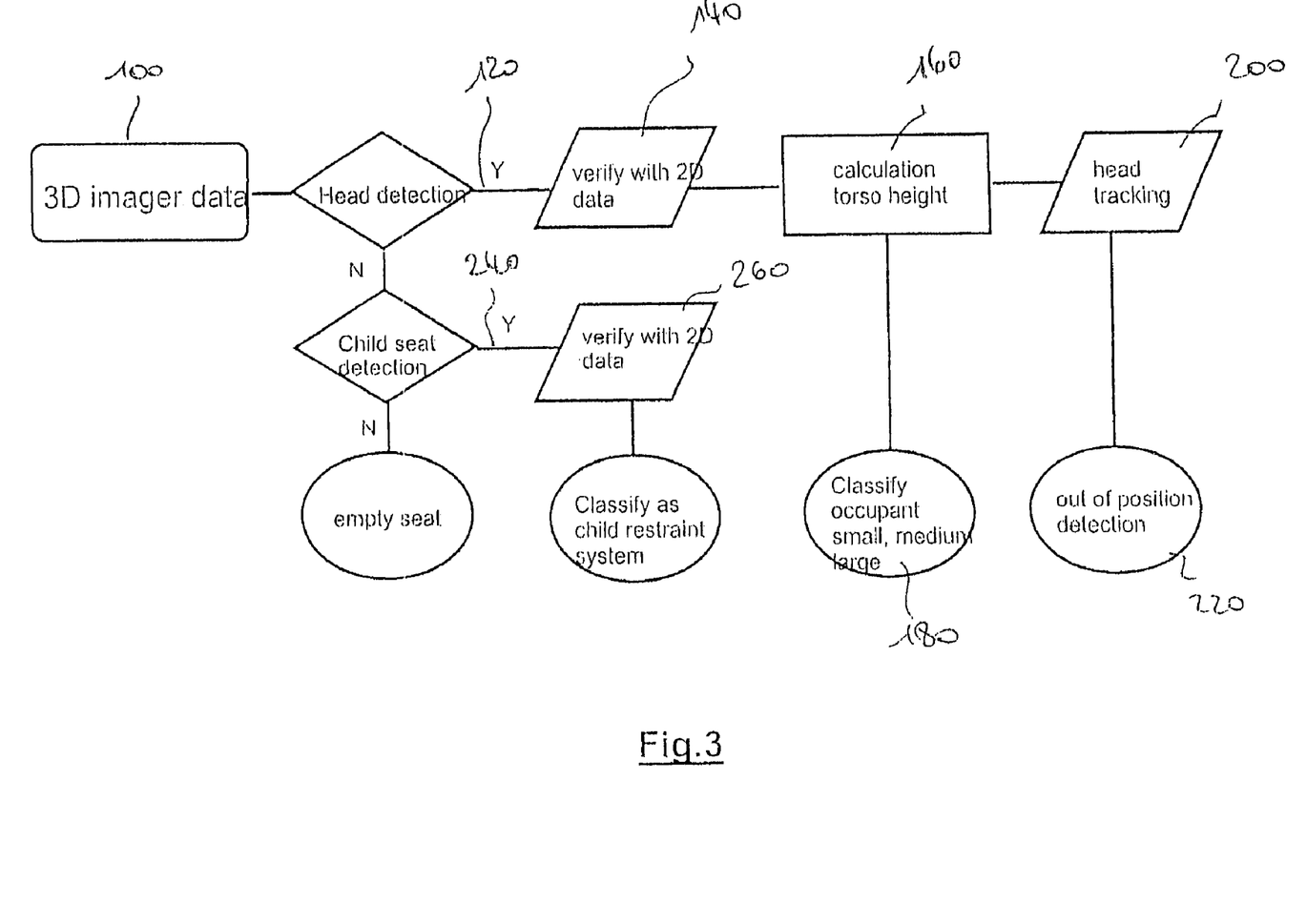
FIG. 3 is a flowchart of an embodiment of a method for classifying a seat occupation.

FIG. 3 shows a flowchart of an embodiment of the method according to the invention in the use for controlling an airbag. At first, a three-dimensional image is taken by means of the 3-D camera and evaluated 100. If this object-detecting operation has the result that the object is a head of a passenger 120 (after verification of the detection with the 2-D system 140), firstly the height of the torso is calculated 160 in order to form a classification 180 of the passenger, and on the other hand the position of the head is followed 200, in order to determine 220 the sitting position.

If the detected object is not a head of a passenger but rather a child's seat 240, the seat occupation is classified as a child's seat occupation after verification with the 2-D system 260, and the airbag is correspondingly switched into a mode which is suitable for this.

Figure 4:
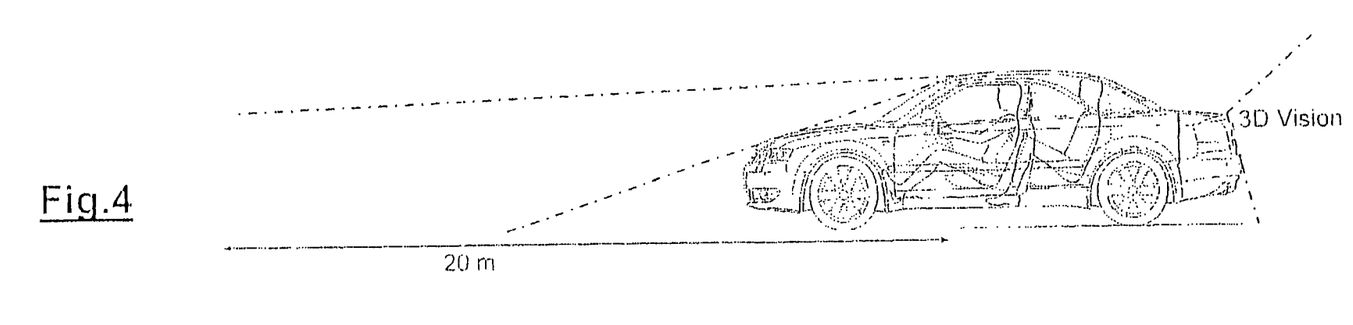
FIG. 4 shows a use of the method in a precrash system.
Figure 5:
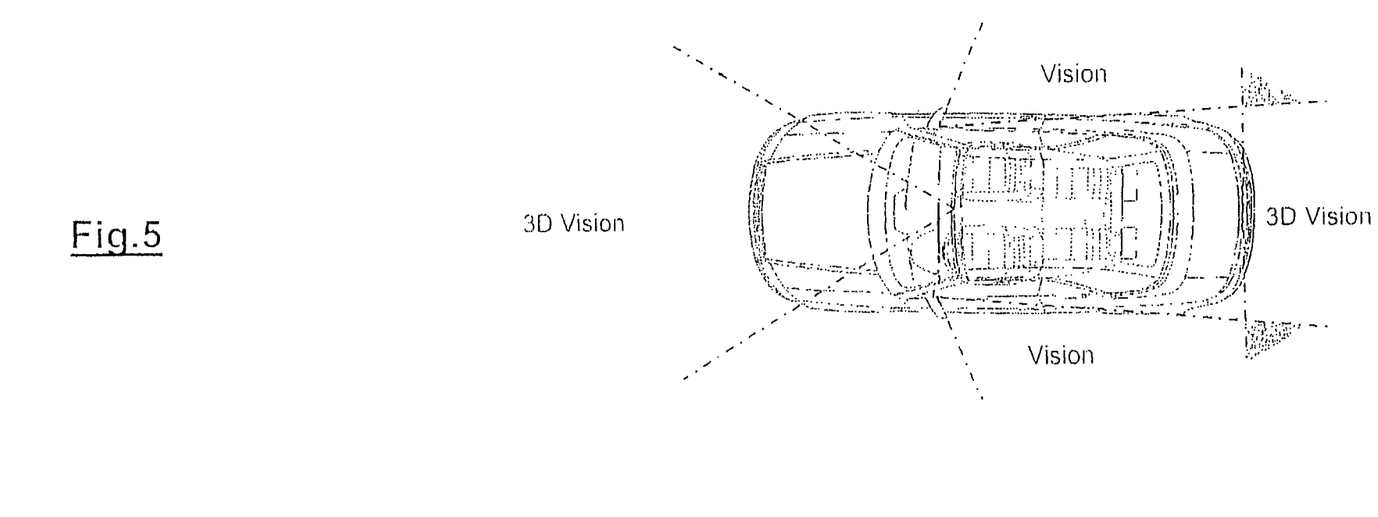
FIG. 5 shows a plan view of the method illustrated in FIG. 4 for illustrating the fields of vision.

FIG. 4 and FIG. 5 show the use of a device in the control of a precrash system. Camera modules which are installed at suitable locations monitor the region in front of and behind a vehicle in order to initiate corresponding protective measures if the vehicle approaches an obstacle. Monitoring of the region to the side of the vehicle is also represented.

Figure 6:
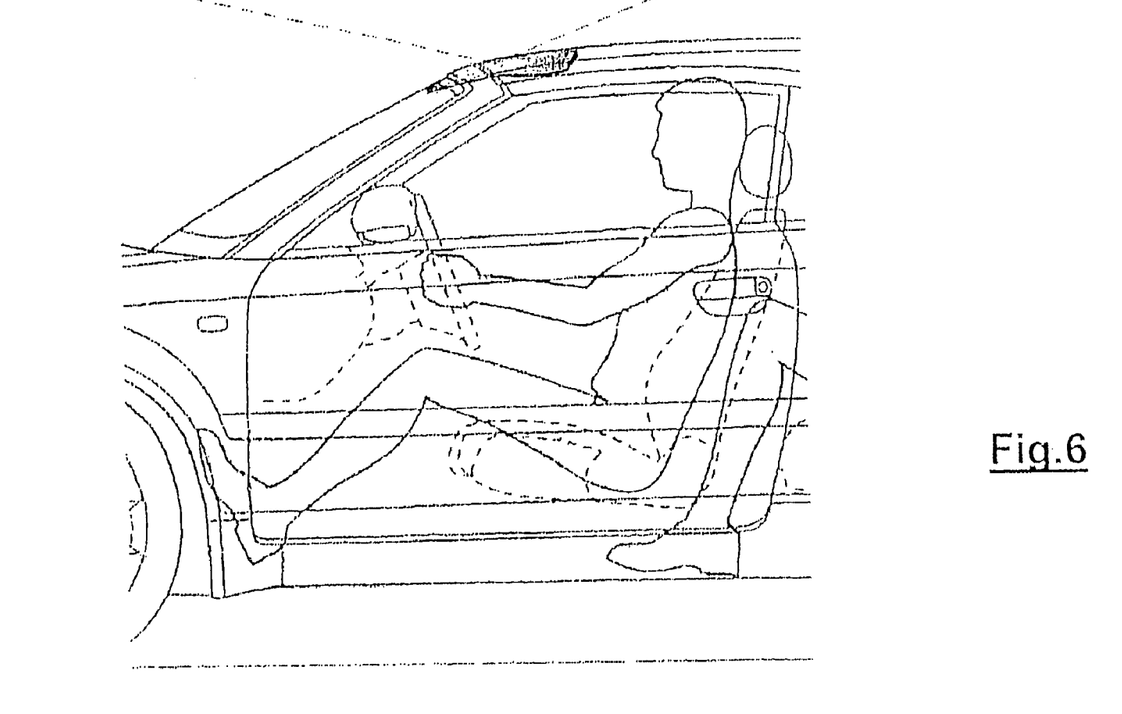
FIG. 6 shows a possible built-in variant of an embodiment of a device according to the invention in a vehicle.
Figure 7:
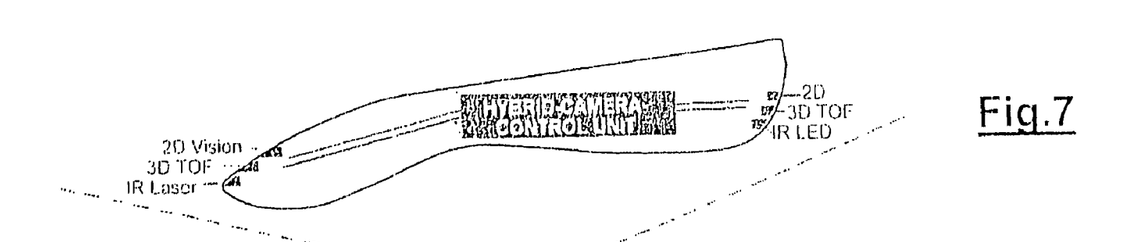
FIG. 7 shows a combined device for monitoring the outside and inside.

FIGS. 6 and 7 illustrate a combined module for sensing the outside and inside as well as a possible built-in variant in a vehicle. In the combined system, various groups composed of the 3-D camera, 2-D camera and illumination system are connected to a single evaluation unit. This can permit a considerable saving of space.

The invention claimed is:

1. A device for detecting and locating objects comprising
   a 3-D camera for recording three-dimensional situation images of a space which is to be monitored;
   first means for evaluating the three-dimensional situation images by means of suitable object detection methods for determining an object which is present in the space which is to be monitored, and for determining the position of the object in the space;
   a 2-D camera for recording two-dimensional situation images of that region of the space which is to be monitored, in which the position of the object has been determined; and
   second means for evaluating the two-dimensional situation images by means of suitable object detection methods for redetermining the object which is present in the space which is to be monitored.

2. A device for detecting and locating objects comprising
   a 3-D camera for recording three-dimensional situation images of a space which is to be monitored;
   first means for evaluating the three-dimensional situation images by means of suitable object detection methods for determining an object which is present in the space which is to be monitored, and for determining the position of the object in the space;
   a 2-D camera for recording two-dimensional situation images of the space which is to be monitored; and
   second means for evaluating a specific region of the two-dimensional situation images by means of suitable object detection methods for redetermining the object which is present in the space which is to be monitored, the specific region corresponding to the region of the space in which the position of the object has been determined.

3. The device as claimed in claim 1, wherein the first means for evaluating the three-dimensional situation images and the second means for evaluating the two-dimensional situation images are implemented in a common processor unit.

4. The device as claimed in claim 1, wherein the 3-D camera and the 2-D camera are arranged directly adjacent to one another.

5. The device as claimed in claim 4, wherein the 3-D camera and the 2-D camera are arranged in a common housing.

6. The device as claimed in claim 1, wherein the 3-D camera and the 2-D camera operate in the same spectral region.

7. The device as claimed in claim 6, comprising a light source for illuminating the space which is to be monitored with light of a wavelength which is contained in the spectral region.

8. The device as claimed in claim 6, wherein the spectral region comprises an infrared region.

9. The device as claimed in claim 6, wherein the 3-D camera, the 2-D camera and the light source are arranged in a common housing.

10. A method for detecting and locating objects, comprising the steps:
    a) recording a first, three-dimensional situation image of a space which is to be monitored by means of a 3-D camera,
    b) evaluating the first, three-dimensional situation image by means of suitable object detection methods for determining an object which is present in the space which is to be monitored, and for determining the position of the object in the space;
    c) recording a second, two-dimensional situation image of a specific region of the space which is to be monitored by means of a 2-D camera, the specific region corresponding to the region of the space in which the position of the object has been determined;
    d) evaluating the second, two-dimensional situation image in order to redetermine the object which is present.

11. A method for detecting and locating objects, comprising the steps
    a) recording a first, three-dimensional situation image of a space which is to be monitored by means of a 3-D camera,
    b) evaluating the first, three-dimensional situation image by means of suitable object detection methods for determining an object which is present in the space which is to be monitored, and for determining the position of the object in the space;

c) recording a second, two-dimensional situation image of the space which is to be monitored by means of a 2-D camera;

d) evaluating a specific region of the second, two-dimensional situation image in order to redetermine the object which is present, the specific region corresponding to the region of the space in which the position of the object has been determined.

12. The method as claimed in claim 10, wherein the 3-D camera and the 2-D camera operate in the same spectral region.

13. The method as claimed in claim 12, comprising the step of illuminating the space which is to be monitored with light of a wavelength which is contained in the spectral region.

14. The method as claimed in claim 12, wherein the spectral region comprises an infrared region.

15. A method for controlling a restraint system in a vehicle, comprising the steps:

a) determining an object and the position of said object in the region of a vehicle seat according to a method as claimed in one of claims 10 or 11, b) generating a control signal which is specific to the type and position of the object which has been determined and transmitting the control signal to a control unit of the restraint system;

c) selecting a suitable function mode of the restraint system on the basis of the control signal which has been transmitted.

16. The method as claimed in claim 15, wherein the object comprises a child's seat.

17. The method as claimed in claim 15, wherein the object comprises the head of a vehicle occupant.

18. The method as claimed in claim 17, wherein the generation of a control signal comprises the calculation of a height of a torso of the vehicle occupant on the basis of the position of the head.

19. A method for avoiding accidents in a vehicle, comprising the steps:

a) determining an object and the position of said object in the region of an area surrounding the driver according to a method as claimed in one of claims 10 or 11, b) initiating suitable measures if the determined position of the object potentially counteracts safe driving of the vehicle.

20. The method as claimed in claim 19, wherein the object comprises a body part of the driver and wherein the suitable measures are initiated if the position of the body part is determined in a region which is associated with an inappropriate body posture for driving the vehicle.

21. The method as claimed in claim 19, wherein the object comprises an item, and wherein the suitable measures are initiated if the position of the item is determined in a field of vision of the driver.

22. The method as claimed in claim 19, wherein the initiation of corresponding measures comprises the generation of a visual or audible warning signal and/or the triggering of an emergency brake system and/or the recording of the driver's behavior and/or the selection of a suitable function mode of the restraint system.

23. Restraint system of a vehicle, comprising a device as claimed in one of claims 1 or 2, wherein the restraint system is switched to a suitable function mode in accordance with the type of the object which is determined and its position in the passenger compartment of the vehicle.

24. Precrash system of a vehicle, comprising a device as claimed in one of claims 1 or 2, wherein suitable safety measures are initiated in accordance with the type of the object which is determined and its position in the area outside the vehicle.

25. Anti-theft warning system in a vehicle comprising a device as claimed in one of claims 1 or 2.

26. The device as claimed in claim 2, wherein the first means for evaluating the three-dimensional situation images and the second means for evaluating the two-dimensional situation images are implemented in a common processor unit.

27. The device as claimed in claim 2, wherein the 3-D camera and the 2-D camera are arranged directly adjacent to one another.

28. The device as claimed in claim 27, wherein the 3-D camera and the 2-D camera are arranged in a common housing.

29. The device as claimed in claim 2, wherein the 3-D camera and the 2-D camera operate in the same spectral region.

30. The device as claimed in claim 29, comprising a light source for illuminating the space which is to be monitored with light of a wavelength which is contained in the spectral region.

31. The device as claimed in claim 29, wherein the spectral region comprises an infrared region.

32. The device as claimed in claim 29, wherein the 3-D camera, the 2-D camera and the light source are arranged in a common housing.

33. The method as claimed in claim 11, wherein the 3-D camera and the 2-D camera operate in the same spectral region.

34. The method as claimed in claim 33, comprising the step of illuminating the space which is to be monitored with light of a wavelength which is contained in the spectral region.

35. The method as claimed in claim 33, wherein the spectral region comprises an infrared region.

36. A Safety system of a vehicle, comprising a device for detecting and locating objects as claimed in one of claims 1 or 2, wherein said device for detecting and locating objects is arranged for monitoring the outside area behind the vehicle and wherein suitable safety measures are initiated in accordance with the type of the object which is determined and its position in the outside area behind the vehicle.

37. The safety system of a vehicle as claimed in claim 36, wherein said initiation of safety measures comprises the generation of a visual or audible warning signal and/or the triggering of an emergency brake system.

* * * * *